United States Patent
Hodgman et al.

(10) Patent No.: US 11,783,047 B1
(45) Date of Patent: Oct. 10, 2023

(54) VULNERABILITY INFERENCE FOR IDENTIFYING VULNERABLE PROCESSES

(71) Applicant: Rapid7, Inc., Boston, MA (US)

(72) Inventors: Roy Hodgman, Cambridge, MA (US); Jonathan Hart, Kernville, CA (US)

(73) Assignee: Rapid7, Inc., Boston, MA (US)

( * ) Notice: Subject to any disclaimer, the term of this patent is extended or adjusted under 35 U.S.C. 154(b) by 282 days.

(21) Appl. No.: 16/917,494

(22) Filed: Jun. 30, 2020

Related U.S. Application Data

(63) Continuation of application No. 16/000,096, filed on Jun. 5, 2018, now Pat. No. 10,740,471.

(51) Int. Cl.
  *G06F 21/57* (2013.01)
  *G06F 8/61* (2018.01)
  *G06N 5/04* (2023.01)

(52) U.S. Cl.
  CPC ............. *G06F 21/577* (2013.01); *G06F 8/62* (2013.01); *G06N 5/04* (2013.01); *G06F 2221/033* (2013.01)

(58) Field of Classification Search
  CPC .... G06F 21/577; G06F 8/62; G06F 2221/033; G06N 5/04
  See application file for complete search history.

(56) References Cited

U.S. PATENT DOCUMENTS

| | | | |
|---|---|---|---|
| 9,501,649 B2 | 11/2016 | Sharma | |
| 9,800,606 B1 | 10/2017 | Yumer | |
| 9,824,216 B1 | 11/2017 | Khalid | |
| 10,235,527 B1* | 3/2019 | Dalessio | G06F 16/901 |
| 2003/0135749 A1 | 7/2003 | Gales | |
| 2012/0222122 A1 | 8/2012 | Das | |
| 2015/0089487 A1 | 3/2015 | Liu | |
| 2015/0268948 A1 | 9/2015 | Plate | |
| 2016/0300065 A1 | 10/2016 | Bang | |
| 2016/0373481 A1* | 12/2016 | Sultan | H04L 63/1433 |
| 2017/0034204 A1 | 2/2017 | El-Moussa | |
| 2017/0329701 A1 | 11/2017 | Patnaik | |
| 2018/0239903 A1 | 8/2018 | Bodin | |
| 2019/0347422 A1 | 11/2019 | Abadi | |

OTHER PUBLICATIONS

Wallen, "How to check package dependencies with apt-rdepends", Apr. 18, 2018, TechRepublic, obtained from https://www.techrepublic.com/article/how-to-check-package-dependencies-with-apt-rdepends/ (Year: 2018).*

Flameeys, "When you should use rdepend and when you should use depend", https://flameeyes.blog/2008/05/15/when-you-should-use-rpdend-and-when-you-should-use-depend/.

* cited by examiner

*Primary Examiner* — Daniel B Potratz
*Assistant Examiner* — Forrest L Carey
(74) *Attorney, Agent, or Firm* — Ashwin Anand

(57) ABSTRACT

Systems and methods for determining an extent of a vulnerability on a computer and remediating the vulnerability. An installed resource set comprising shared software resources installed on the computer is enumerated. A vulnerable resource is identified in the installed resource set. A vulnerable process set including at least one vulnerable process that uses the vulnerable resource is enumerated. And, the vulnerable process is remediated.

16 Claims, 3 Drawing Sheets

VULNERABILITY INFERENCE FOR IDENTIFYING VULNERABLE PROCESSES

The present application claims the benefit of pending U.S. utility patent application Ser. No. 16/000,096, filed on Jun. 5, 2018, and issued as U.S. Pat. No. 10,740,741, on Aug. 11, 2018, the entire disclosure of which is incorporated by reference as if set forth in its entirety herein.

TECHNICAL FIELD

This invention generally relates to systems and methods for computer security and, more particularly but not exclusively, to systems and methods for determining an extent of a compromise related to a vulnerable shared software resource.

BACKGROUND

Vulnerabilities are often found in widely distributed and used software. Typically, once a vulnerability is discovered in an application, the application is updated to remove the vulnerability. This practice has become commonplace, not only for software developers and information technology professionals, but also for the end users who are often notified during the update process.

Libraries and other shared software resources provide a set of tools and resources which may be used by any number of applications on a computer. Libraries limit duplication of effort by software developers and regularize often implemented computer methods.

Unlike vulnerable applications, the extent of a vulnerability resulting from a vulnerable library is neither limited or immediately known. The extent is not limited because there is no limit to the number of applications or processes that may use the library and, as a result, may be compromised. And the extent is not known as developers of the library do not know what applications or processes are employing the library in the field and computer users do not typically keep track of the multitude of dependencies required by their installed software. Therefore, a particularly insidious and powerful security threat results when a shared software resource contains a vulnerability.

Therefore a need exists for methods and systems for identifying a vulnerable shared software resource on a computer and determining an extent to which the vulnerable resource has made the rest of the computer vulnerable to attack.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for determining an extent of a vulnerability. The method includes connecting to a computer; enumerating an installed resource set comprising shared software resources installed on the computer; identifying a vulnerable resource in the installed resource set; enumerating a vulnerable process set comprising at least one vulnerable process installed on the computer that uses the vulnerable resource; and remediating the at least one vulnerable process.

In some embodiments of the method, remediating the at least one vulnerable process includes at least one of transmitting a message identifying the at least one vulnerable process; updating the vulnerable resource used by the at least one vulnerable process; uninstalling the vulnerable resource used by the at least one vulnerable process; terminating the at least one vulnerable process; and uninstalling software implementing the at least one vulnerable process.

In some embodiments of the method, the installed resource set comprises at least one of a library, a standalone application, a subroutine, and a software framework.

In some embodiments of the method, identifying the vulnerable resource further includes retrieving a version number associated with a shared software resource belonging to the installed resource set; and identifying a vulnerability associated with the version number of the shared software resource.

In some embodiments of the method, the installed resource set includes a remotely-accessible resource that is accessible by the computer through a network interface.

In some embodiments of the method, connecting to the computer comprises at least one of connecting to the computer using a network and connecting to the computer using a local interface.

In some embodiments of the method, the vulnerable process set includes at least one of an active process, an inactive process, a local process, a remote process, and a process communicated over a network.

In some embodiments of the method, enumerating the installed resource set includes querying a package management system associated with the computer.

In some embodiments of the method, enumerating the vulnerable process set comprises at least one of querying the package management system and querying the computer for metadata associated with a process using a vulnerable resource.

In another aspect, embodiments relate to a system configured to determine the extent of a vulnerability. The system includes a network interface that is configured to communicate by way of a network. The system also includes a memory configured to store instructions, and a processor to execute the instructions. The instructions are to perform operations, including connecting to a computer; enumerating an installed resource set comprising shared software resources installed on the computer; identifying a vulnerable resource in the installed resource set; enumerating a vulnerable process set comprising at least one vulnerable process installed on the computer that use the vulnerable resource; and remediating the at least one vulnerable process.

In some embodiments of the system, the operation for remediating the at least one vulnerable process includes at least one of transmitting a message identifying the at least one vulnerable process; uninstalling the vulnerable process; terminating the at least one vulnerable process; and uninstalling software implementing the at least one vulnerable process.

In some embodiments of the system, the installed resource set comprises at least one of a library, a standalone application, a subroutine, and a software framework.

In some embodiments of the system, the operation for identifying the vulnerable resource further includes retrieving a version number associated with a shared software resource belonging to the installed resource set; and identifying a vulnerability associated with the version number of the shared software resource.

In some embodiments of the system, the installed resource set includes a remotely-accessible resource that is accessible by the computer through the network interface.

In some embodiments of the system, the operation of connecting to the computer comprises at least one of connecting to the computer using the network interface and connecting to the computer using a local interface.

In some embodiments of the system, the vulnerable process set includes at least one of an active process, an inactive process, a local process, a remote process, and a process communicated over the network.

In some embodiments of the system, the operation for enumerating the installed resource set includes querying a package management system associated with the computer.

In some embodiments of the system, the operation for enumerating the vulnerable process set comprises at least one of querying the package management system and querying the computer for metadata associated with a process using a vulnerable resource.

In yet another aspect, some embodiments relate to a non-transitory computer readable media storing instructions that are executable by a processing device. Such that upon execution of the instructions, the processing device performs operations that include connecting to a computer; enumerating an installed resource set comprising shared software resources installed on the computer; identifying a vulnerable resource in the installed resource set; enumerating a vulnerable process set comprising at least one vulnerable process installed on the computer that use the vulnerable resource; and remediating the at least one vulnerable process.

In some embodiments of the non-transitory computer readable media storing instructions, the operation for remediating the at least one vulnerable process includes at least one of transmitting a message identifying the at least one vulnerable process; updating the vulnerable resource used by the at least one vulnerable process; uninstalling the vulnerable resource used by the at least one vulnerable process; terminating the at least one vulnerable process; and uninstalling software implementing the at least one vulnerable process.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
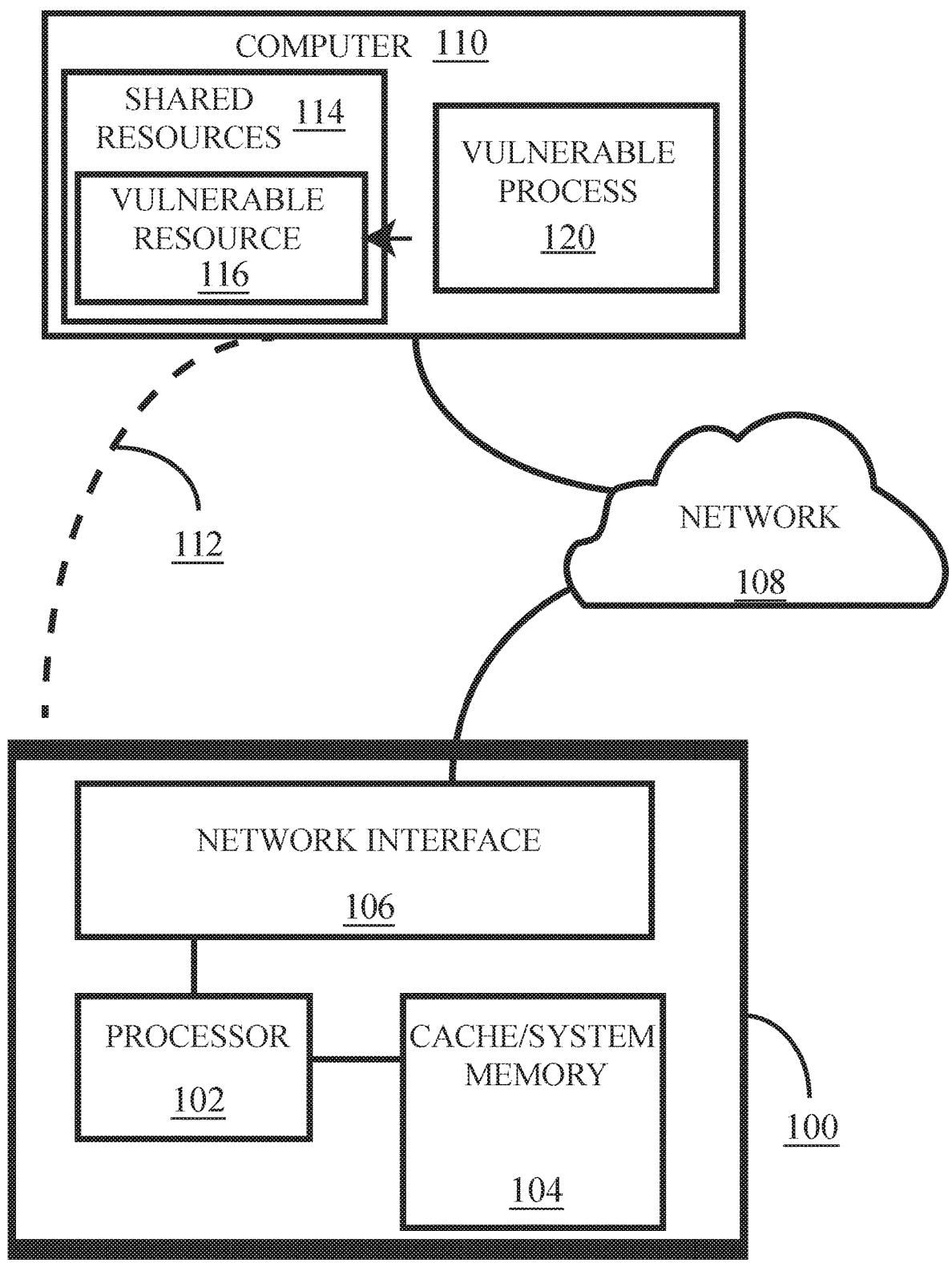
FIG. 1 illustrates a sample vulnerability inference system in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Referring to FIG. 1, a sample vulnerability inference system 100 is shown according to some embodiments. Generally, the vulnerability inference system includes a processor 102 and a memory 104. The processor 102 executes instructions typically stored by the memory 104. Typically an operating system and/or other services manage the operation of the processor 102 and the memory 104, as well as other hardware, if present, such as a network interface 106.

According to some embodiments, the vulnerability inference system 100 includes a network interface 106. The network interface 106 accesses a network 108, allowing the vulnerability interface system 100 to connect with a computer 110 through the network 108. Examples of networks include local area networks (LAN), metropolitan area networks (MAN), wide area networks (WAN), and mobile networks. According to other embodiments, the vulnerability inference system 100 connects to the computer 110 through a local interface 112.

Continuing in reference to FIG. 1, the computer 110 is shown having shared resources 114 installed. Shared resources 114 generally include one or more of a library, a standalone application, a subroutine, and a software framework.

An example of a shared resource is libpcre. Libpcre is the Old Perl 5 Compatible Regular Expression Library, a library of functions to support regular expressions whose syntax and semantics are close to those of the Perl 5 language.

The shared resources 114 are typically used by one or more processes executed by the computer 110. In some embodiments, the one or more processes include at least one of an active process, an inactive process, a local process, a remote process, and a process communicative over a network 108

The vulnerability inference system 100 enumerates shared software resources 114 installed on the computer 110. According to some embodiments, enumerating the shared software resources 114 comprises querying a package management software to return an installed resource set of installed shared resources 114. In some embodiments, the package management software additionally returns a version number for each installed resource in the installed resource set 114.

The vulnerability inference system 100 identifies a vulnerable resource 116 in the installed resource set.

Then the vulnerability inference system 100 enumerates a vulnerable process set that comprises at least one vulnerable process 120 that uses the vulnerable resource 116. According to some embodiments, a package management system is queried in enumerating the at least one vulnerable process 120. Additionally according to some embodiments, metadata associated with the vulnerable resource 116 and provided by an operating system is used to identify the at least one vulnerable process.

Then the vulnerability inference system 100 remediates the vulnerable process. According to some embodiments, remediating the vulnerable process includes one or more of uninstalling the resource, disabling access to the resource, and installing a non-vulnerable version of the resource. In other embodiments, remediating the at least one vulnerable process includes at least one of transmitting a message identifying the at least one vulnerable process; uninstalling the vulnerable process; terminating the at least one vulnerable process; and uninstalling software implementing the at least one vulnerable process.

Figure 2:
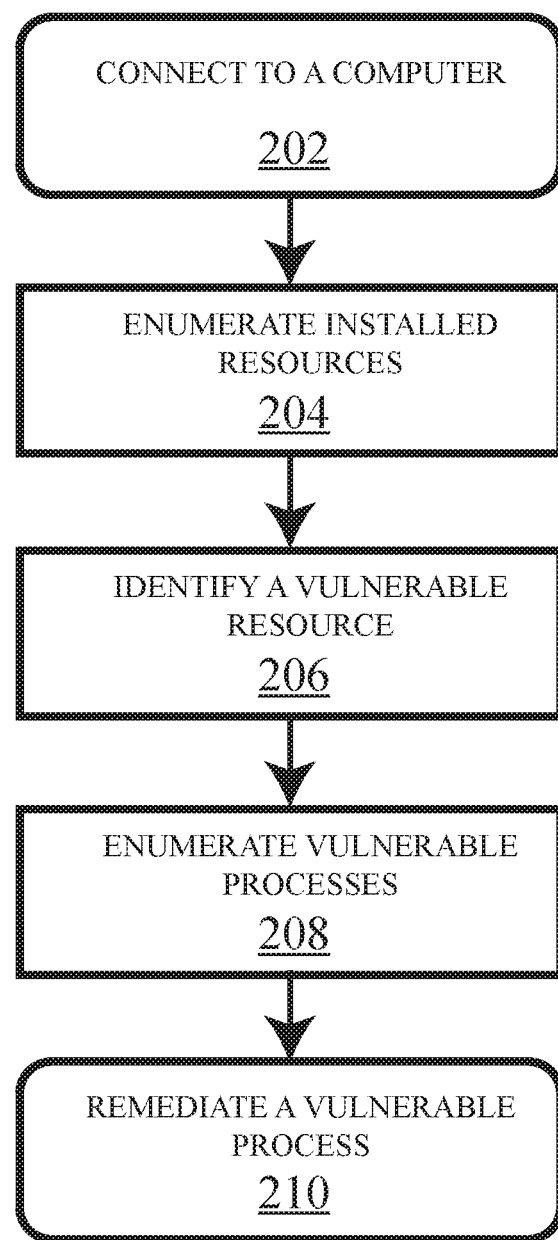
FIG. 2 presents a flowchart of a method for determining an extent of a vulnerability in accordance with one embodiment.

Referring now to FIG. 2, a flow chart is shown that details a vulnerability inference process for determining an extent of a vulnerability. A first step of connecting to a computer 202 allows system level access to the computer. The computer is commonly referred to as a target in computer security nomenclature as it is to be the focus of the efforts. As described above, connecting to the computer 202 is achieved in some embodiments by way of a network. According to some embodiments, connecting to the computer 202 uses an operating system and a service to communicate through the network. For example, a Linux operating system is used in some embodiments with secure shell (SSH) remote access protocol to connect to the computer 202 by way of the network. Other examples of operating systems include Microsoft Windows, Mac OS X, Unix, BSD/OS, SunOS, and Solaris. Examples of common remote access protocols include telnet, remote shell (RSH), Windows remote shell (WinRS), and mobile shell (MOSH). According to some embodiments, connecting to the computer 202 is achieved through a local interface. For example, connecting to the computer 202 achieves system level access through a shell local to the computer. Examples of local shells include Bourne again shell (BASH), Windows PowerShell, and tee-see shell (TCSH).

Once a connection to the computer is achieved, a set of installed resources is enumerated 204. According to some embodiments, enumerating installed resources 204 includes querying package management systems for a list of installed resources. Examples of package management systems common to Linux include dpkg and apt for Debian-based distributions and rpm and yum for Red Hat-based distributions. An exemplary command that enumerates installed packages on a typical Debian-based Linux computer is "dpkg -l." A first 10 lines returned from a "dpkg -l" command on a typical computer are shown below:

```
$ dpkg -l | head -n 10
Desired=Unknown/Install/Remove/Purge/Hold
| Status=Not/Inst/Conf-files/Unpacked/half-conf/Half-inst/trig-aWait/Trig-pend
|/Err?=(none)?Reinst-required (Status,Err: uppercase=bad)
```

-continued

| ||/Name | Version | Description |
|---|---|---|
| +++================================================================ |
| ====== |
| ii accountsserive | 0.6.15-2ubuntu9 | query and manipulate user account |
| information |
| ii acpid | 1:2.0.10-1ubuntu3 | Advanced Configuration and Power |
| Interface event |
| ii adduser | 3.11ubuntu2 | add and remove users and groups |
| ii apache2 | 2.2.22-1ubuntu1.4 | Apache HTTP Server metapackage |
| ii apache2-mpm-worker | 2.2.22-1ubuntu1.4 | Apache HTTP Server – high speed threaded |
| model |

After enumerating installed resources 204, a vulnerable resource is identified 206. According to some embodiments, this is achieved by correlating the installed resource set with one or more known vulnerable resources. Continuing with the above example, a shared resource set that includes libpcre3 version 8.12-4 is enumerated below:

```
$ dpkg -l | grep pcre
ii libpcre3      8.12-4      Perl 5 Compatible Regular
```
Expression Library Information related to the presence of vulnerabilities in resources is available. For example, lists enumerating common vulnerabilities and exposure (CVEs) are maintained and publicly available. Additionally, security notices related to a particular resource list associated with the particular resource as well as describing the latest stable version number of the particular resource are available. Continuing again with the above example, it can be seen from Ubuntu Security Notice 2943-1 (USN-2943-1: PCRE vulnerabilities available at https://usn.uhuntu.com/usn/usn-2943-1/) that version 8.12-4 of libpcre3 has 25 CVEs and a fix version of 8.12-4ubuntu0.2. Therefore, libpcre3 8.12-4 is identified as a vulnerable resource 206.

apache2.2-bin
libglib2.0-0

It can be seen above that the installed web server process Apache (HTTPD) 2.2 requires libpcre3 and is a vulnerable process as a result of being dependent upon the vulnerable resource.

According to another embodiment, some but not all of the software installed on the computer is managed through a package management system. And as a result, some installed software is not enumerated by way of a query to the package management system. This situation commonly occurs where specialized software is custom built and compiled from source on the target computer. As an example, the computer has Ubuntu Linux 12.04 and is running Apache Tomcat, which was installed from source without a package management system. The Apache server still depends upon libpcre3, which is a known vulnerable resource, however the package management system is not maintaining a list of dependencies for Apache. In this situation, metadata provided by the operating system may be tracked to identify a vulnerable process. Continuing with the example, the below command identifies a java process with process ID (PID) 1099 utilizing libpcre3:

```
$ dpkg -l libpcre3 | grep /lib/ | sort | uniq | parallel –gnu "test -f { } && lsof { }"
COMMAND  PID   USER  FD   TYPE  DEVICE  SIZE/OFF  NODE    NAME
java     1099  root  mem  REG   8,1     247896    262231  /lib/x86_64-
lin...
```

The below command examines the PID, identifying the vulnerable process, Apache Tomcat:

```
$ ps -f -p 1099
UID   PID   PPID  C  STIME  TTY  TIME      CMD
root  1099  1     0  Sep18  ?    01:20:09  /usr/bin/java -D
java.util.logging.config.file=/root/apache-tomcat-6.0.37/conf/logging.properties -D
java.util.logging manager=org.apache.juli.ClassLoaderLogManager -D
java.endorsed.dirs=/root/apache-tomcat-6.0.37/endorsed -classpath /root/apache-tomcat-
6.0.37/bin/bootstrap.jar -D catalina.base=/root/apache-tomcat-6.0.37 -D
catalina.home=/root/apache-tomcat-6.0.37 -D java.io.tmpdir=/root/apache-tomcat-6.0.37/temp
org.apache.catalina.startup.Bootstrap start
```

Once a vulnerable resource is identified 206, at least one vulnerable process is enumerated 208. According to some embodiments, a package management system is queried as part of the enumerating the vulnerable processes 208. Continuing with the example, on a Debian-based Linux distribution, reverse dependencies are enumerated by apt package management system, see below:
  $apt-cache rdepends libpcre3-installed
  libpcre3
  Reverse Depends:

According to some embodiments further investigation of the vulnerable process identifies what if any communication the vulnerable process is capable of over a network. Continuing with the above example, further investigation of Apache Tomcat using tools identifies that Apache Tomcat is listening on port 8080 ("http-alt") and 8009. The above example therefore shows a situation in which a vulnerability in a shared resource (libpcre3) resulting in an otherwise unknown vulnerability to a network communicative process (Apache Tomcat) can be identified and enumerated.

Finally, the vulnerable process is remediated 210. According to some embodiments, remediating the vulnerable process 210 includes updating the vulnerable resource the vulnerable process uses. Updating the vulnerable resource typically comprises installing a fix version of the vulnerable resource to replace a vulnerable version of the vulnerable resource that is known to contain a vulnerability. Typically, the fix version does not contain the vulnerability. Generally, the fix version has a version number that is different than the vulnerable version. Often, the fix version has a version number that is greater than the vulnerable version, because the fix version was developed after the vulnerable version. This is often called upgrading. However, sometimes a fix version will have a version number that is smaller than the vulnerable version, for example when an earlier version of a resource does not contain the vulnerability. This is sometimes called downgrading. In still other cases, a fix version will have the same version number as the vulnerable version, for example, when the vulnerability is minor.

According to some embodiments, remediating the vulnerable process 210 includes updating the vulnerable process. Updating the vulnerable process typically comprises installing a fix version of the vulnerable process to replace a vulnerable version of the vulnerable process. Typically, the fix version of the vulnerable process does not use the vulnerable resource or makes one or more accommodations, such that the vulnerability is redressed in the fix version.

Commonly, both the vulnerable process and the vulnerable resource it uses are updated at the same time. In some embodiments, this is done with a package management system that checks for and installs updates on both the vulnerable process and the vulnerable resource upon which it depends.

According to some embodiments, remediating the vulnerable process 210 comprises uninstalling the vulnerable resource. For example when the vulnerable process is not dependent upon the vulnerable resource but the vulnerable resource is optionally used by the vulnerable process, uninstalling the vulnerable resource alone remediates the vulnerable process 210. Likewise in some embodiments, remediating a vulnerable process 210 comprises uninstalling the vulnerable process. For example, the vulnerable process may be superfluous to the computer and uninstalled without consequence.

According to some embodiments, remediating a vulnerable process 210 comprises terminating the vulnerable process. For example in some embodiments, the vulnerable process is actively running on the computer and a compromise posed by the vulnerable process is generally only present while the vulnerable process continues running. In such circumstances remediating the vulnerable process 210 can be achieved quickly by terminating the vulnerable process/

According to some embodiments remediating the vulnerable resource 210 comprises transmitting a message that identifies the one or more vulnerable processes. Although, it may be ideal to update all vulnerable resources and processes as soon as they are discovered to contain vulnerabilities it is not always practical or possible to do so. For example, when updates result in a change to the computer and changes require testing before after or during implementation. In another example, where multiple resources contain vulnerabilities and multiple processes are known to depend upon each of the multiple vulnerable resources, a significant number of updates may be required to update all of the vulnerable processes and resources. This situation is further compounded where each update requires testing updating all vulnerable processes and resources and, in the aggregate, requires a large amount of time. For the aforementioned reasons, remediating a vulnerable process 210 is in some circumstances is best achieved by messaging details about the vulnerable process to a system administrator.

Figure 3:
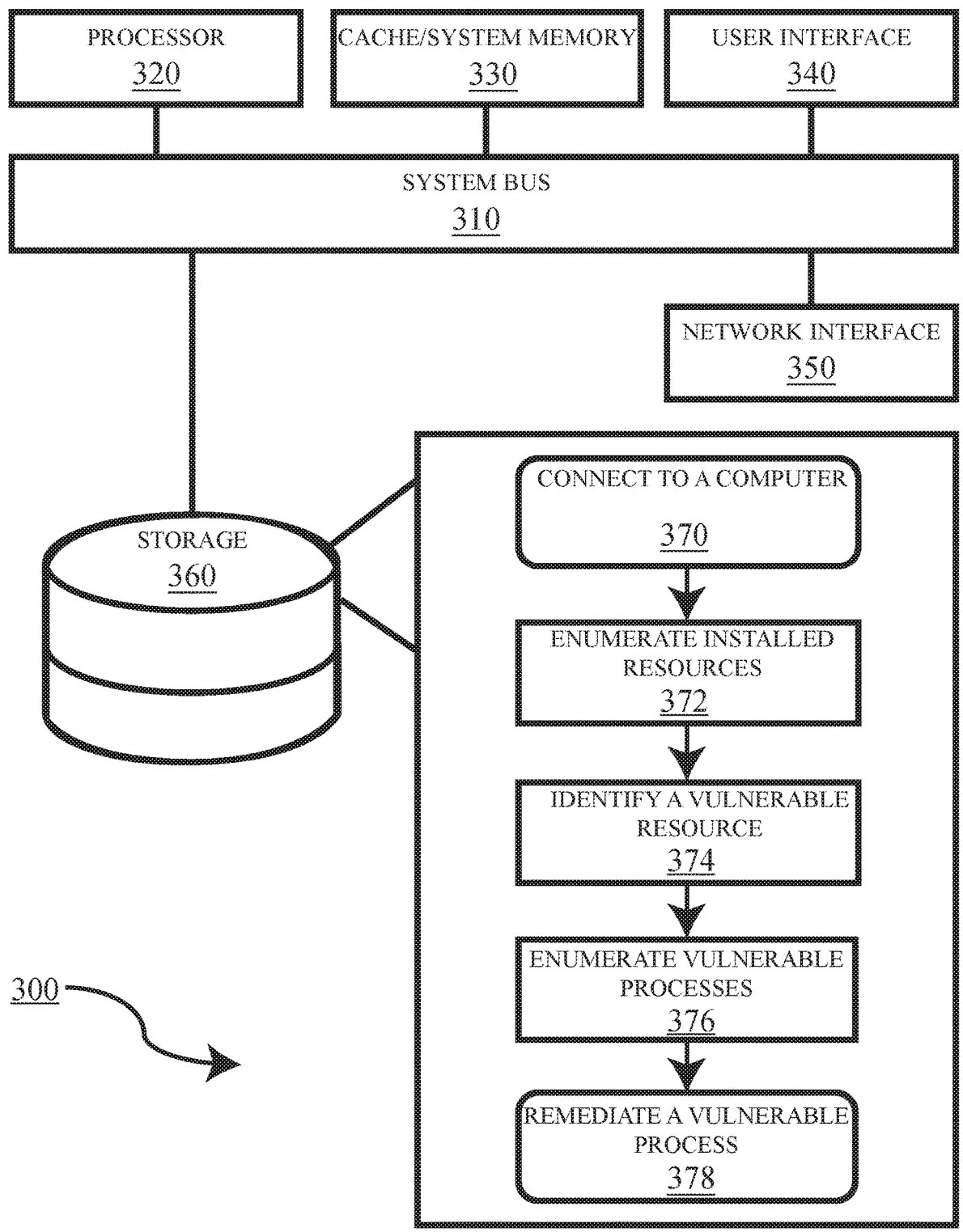
FIG. 3 depicts a system for determining an extent of a vulnerability in accordance with one embodiment.

FIG. 3 illustrates a system for vulnerability inference in accordance with one embodiment. The system 300 may include a processor 320, memory 330, a user interface 340, a network interface 350, and storage 360, all interconnected via one or more system buses 310. It will be understood that FIG. 3 constitutes, in some respects, an abstraction and that the actual organization of the system 300 and the components thereof may differ from what is illustrated.

The processor 320 may be any hardware device capable of executing instructions stored on memory 330 and/or in storage 360, or otherwise any hardware device capable of processing data. As such, the processor 320 may include a microprocessor, field programmable gate array (FPGA), application-specific integrated circuit (ASIC), or other similar devices.

The memory 330 may include various transient memories such as, for example L1, L2, or L3 cache or system memory. As such, the memory 330 may include static random access memory (SRAM), dynamic RAM (DRAM), flash memory, read only memory (ROM), or other similar memory devices and configurations.

The user interface 340 may include one or more devices for enabling communication with system operators and other personnel. For example, the user interface 340 may include a display, a mouse, and a keyboard for receiving user commands. In some embodiments, the user interface 340 may include a command line interface or graphical user interface that may be presented to a remote terminal via the network interface 350. The user interface 340 may execute on a user device such as a PC, laptop, tablet, mobile device, or the like, and may enable a user to review vulnerable resources and processes, for example.

The network interface 350 may include one or more devices for enabling communication with other remote devices to access a target computer for vulnerability inference. The network interface 350 may also allow for downloading of updates to software applications (e.g. resources and processes) that contain vulnerabilities. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon which the processor 320 may operate.

For example, the storage 360 may include instructions to connect to a computer 370; enumerate resources installed on the computer 372; identify a vulnerable resource installed on the computer 374; enumerate at least one vulnerable process using the vulnerable resource 376; and remediate at least one vulnerable process 378.

Instructions to connect to a computer 370 may include gaining system level access to a computer using the network interface 350 by way of a network. According to some embodiments, the computer may comprise the vulnerability inference system. In which case, connecting to a computer 370 may include gaining system level access to one or more components of the vulnerability inference system 300, for example one of: the processor 320, the system memory 330, the user interface, and the system bus 310.

Instructions to enumerate installed resources 372 may include instructions to enumerate an installed resource set comprising shared software resources installed on the computer. Enumerating installed resources 372 may include querying a package management system installed on the computer. Additionally, enumerating installed resources 372 may include listing contents of a directory on the computer known to contain installed software resources, for example various lib directories on a UNIX based computer, or using ldd or similar utilities against executables to identify additional shared resource paths.

Instructions to identify a vulnerable resource 374 may include instructions to identify a vulnerable resource installed on the computer. Identifying a vulnerable resource 374 may include identifying a vulnerable resource within the installed resource set. For example, a vulnerable resource set may be compared with the installed resource set, such that a resource belonging to both the vulnerable resource set and the installed resource set is identified as a vulnerable resource installed on the computer.

Instructions to enumerate vulnerable processes 376 may include instructions to enumerate a vulnerable process set comprising one or more vulnerable processes that use the vulnerable resource on the computer. Enumerating vulnerable processes 376 may include querying a package management system for applications dependent upon the vulnerable resource. Additionally, enumerating vulnerable processes 376 may include querying an operating system for metadata associated with use of the vulnerable resource. For example, lsof, ldd, and similar tools could be used to inspect the files loaded by a process at runtime.

Instructions to remediate a vulnerable process may include instructions to remediate a vulnerable process that belongs to the vulnerable process set. Remediating the vulnerable process 378 may include performing an update to the vulnerable resource used by the vulnerable process. Performing the update may replace a vulnerable version of the vulnerable resource with a fix version. Remediating the vulnerable process 378 may include performing an update to the vulnerable process. Remediating the vulnerable process 378 may include uninstalling the vulnerable resource from the computer. Remediating the vulnerable resource 378 may include uninstalling the vulnerable process from the computer. Remediating the vulnerable process 378 may include terminating the vulnerable process. Remediating the vulnerable process 378 may include transmitting a message that includes one or more details about the vulnerable process. The message may be transmitted by way of a network using the network interface 350. Additionally, the message may be transmitted directly to a user by way of the user interface 340, for example by way of dialog displayed on a monitor. The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:
1. A method, comprising:
    querying a package management system to enumerate a library set comprising a library that is used by a process executing on an operating system of a computer;
    identifying a vulnerable library in the enumerated library set;

enumerating a vulnerable process executing on the operating system by querying the package management system to return a list of reverse dependencies that identifies the vulnerable process as being vulnerable by virtue of using the vulnerable library;

tracking metadata provided by the operating system to identify another vulnerable process that uses the vulnerable library but is not enumerated in the list of reverse dependencies returned by the package management system; and remediating the vulnerable process and the another vulnerable process by installing a fix version of the vulnerable process and another fix version of the another vulnerable process, wherein the fix version and the another fix version exclude a vulnerable resource associated with the vulnerable process.

2. The method according to claim 1, wherein the remediating further comprises at least one of: transmitting a message identifying the vulnerable process, updating the vulnerable library used by the vulnerable process, uninstalling the vulnerable library used by the vulnerable process, terminating the vulnerable process, and uninstalling software implementing the vulnerable process.

3. The method according to claim 1, wherein identifying the vulnerable library comprises retrieving a version number associated with a shared software library in an installed resource set and identifying a vulnerability associated with the retrieved version number of the shared software library.

4. The method according to claim 1, wherein the vulnerable library comprises a remotely-accessible resource being made accessible by the operating system through a network interface.

5. The method according to claim 1, further comprising at least one of: connecting to the computer using a network and connecting to the computer using a local interface.

6. The method according to claim 1, wherein the process comprises at least one of: an active process, an inactive process, a local process, a remote process, and a process communicative over a network.

7. The method according to claim 1, further comprising: querying the computer for the metadata associated with the another vulnerable process using the vulnerable resource.

8. A system configured to determine the extent of a vulnerability, the system comprising:

a network interface configured to communicate by way of a network;

a memory configured to store instructions; and a processor to execute the instructions to perform operations comprising:

querying a package management system to enumerate a library set comprising a library that is used by a process executing on an operating system of a computer;

identifying a vulnerable library in the enumerated library set;

enumerating a vulnerable process executing on the operating system by querying the package management system to return a list of reverse dependencies that identifies the vulnerable process as being vulnerable by virtue of using the vulnerable library;

tracking metadata provided by the operating system to identify another vulnerable process that uses the vulnerable library but is not enumerated in the list of reverse dependencies returned by the package management system; and remediating the vulnerable process and the another vulnerable process by installing a fix version of the vulnerable process and another fix version of the another vulnerable process, wherein the fix version and the another fix version exclude a vulnerable resource associated with the vulnerable process.

9. The system according to claim 8, wherein the remediating further comprises at least one of: transmitting a message identifying the vulnerable process, updating the vulnerable library used by the vulnerable process, uninstalling the vulnerable library used by the vulnerable process, terminating the vulnerable process, and uninstalling software implementing the vulnerable processes.

10. The system according to claim 8, wherein identifying the vulnerable library comprises retrieving a version number associated with a shared software library in an installed resource set and identifying a vulnerability associated with the version number of the shared software library.

11. The system according to claim 8, wherein the vulnerable library comprises a remotely-accessible resource being accessible to the operating system by way of the network interface.

12. The system according to claim 8, wherein the processor is further configured to perform at least one of: connecting to the computer using the network and connecting to the computer using a local interface.

13. The system according to claim 8, wherein the vulnerable process comprises at least one of: an active process, an inactive process, a local process, a remote process, and a process communicative over the network.

14. The system according to claim 8, further comprising: querying the computer for the metadata associated with the another vulnerable process using the vulnerable resource.

15. A non-transitory computer readable media storing instructions that are executable by a processing device, and upon such execution cause the processing device to perform operations comprising:

querying a package management system to enumerate a library set comprising a library that is used by a process executing on an operating system of a computer;

identifying a vulnerable library in the enumerated library set;

enumerating a vulnerable process executing on the operating system by querying the package management system to return a list of reverse dependencies that identifies the vulnerable process as being vulnerable by virtue of using the vulnerable library;

tracking metadata provided by the operating system to identify another vulnerable process that uses the vulnerable library but is not enumerated in the list of reverse dependencies returned by the package management system; and remediating the vulnerable process and the another vulnerable process by installing a fix version of the vulnerable process and another fix version of the another vulnerable process, wherein the fix version and the another fix version exclude a vulnerable resource associated with the vulnerable process.

16. The non-transitory computer readable media according to claim 15, wherein the remediating further comprises at least one of: transmitting a message identifying the vulnerable process, updating the vulnerable library used by the vulnerable process, uninstalling the vulnerable library used by the vulnerable process, terminating the vulnerable process, and uninstalling software implementing the vulnerable process.

* * * * *